Patented Sept. 19, 1922.

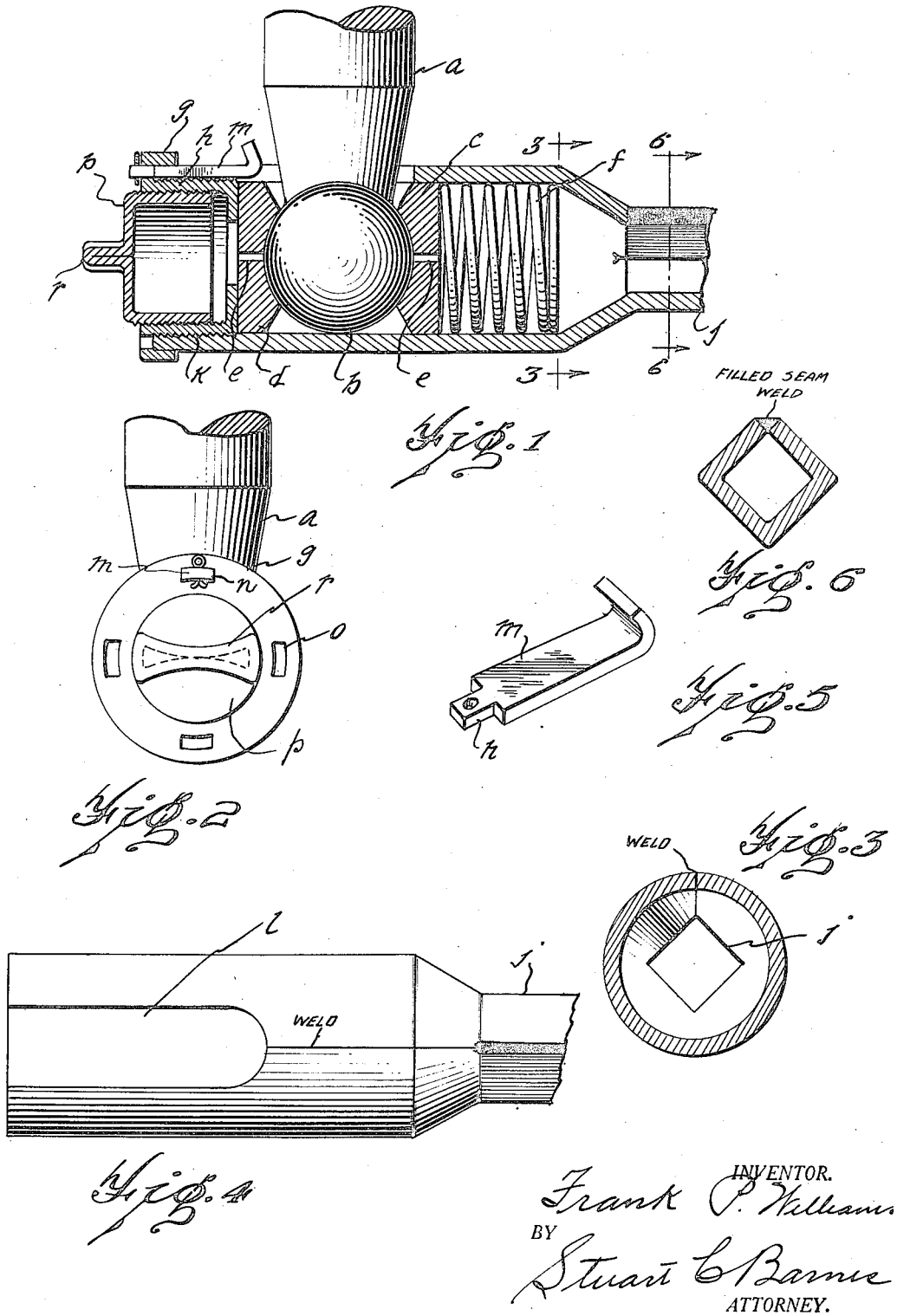

1,429,705

UNITED STATES PATENT OFFICE.

FRANK P. WILLIAMS, OF DETROIT, MICHIGAN.

DRAG LINK.

Application filed July 5, 1921. Serial No. 482,299.

*To all whom it may concern:*

Be it known that I, FRANK P. WILLIAMS, a citizen of the United States, residing at Detroit, in the county of Wayne and State of Michigan, have invented certain new and useful Improvements in Drag Links, of which the following is a specification.

This invention relates to drag links for the steering gear of automobiles. It has for its object a drag link which is made as a stamping and which is provided with a special form of stamped cap that is locked in position by a stamped key.

The cross section of the main part of the drag link is square while the cross section of the end is circular.

In the drawings,—

Fig. 1 is a longitudinal section fragmentary in character showing the end of the drag link.

Fig. 2 is an end elevation.

Fig. 3 is a section on the line 3—3 of Fig. 1.

Fig. 4 is a plan view of the end of the drag link.

Fig. 5 is a perspective of the key.

Fig. 6 is a section through the rod portion of the drag link, taken on the line 6—6 of Fig. 1.

*a* designates the steering arm; *b* the ball on the end of the steering arm which is contained between two abutments *c* and *d*, each of which is provided with a lubricating passage *e*. The usual coiled spring *f* serves to force one abutment against the ball while the other abutment bears against the cap or stamped plug *h*. This plug is a special departure from conventional construction, which is simply a solid screw plug. My plug is externally screw-threaded and is formed as a stamping with a turned-over annular flange *g* for the purpose presently to be described.

The drag link proper is formed simply of a stamping. The metal is punched out and then formed up by suitable die operations to form a cylindrical end and a square rod portion *j*. I find the square cross section relatively strong to stand the stresses brought upon the drag link, and relatively easy to accomplish in the die operations. Further, the square cross section permits the abutting edges to be brought together, corner to corner, and leaves a groove in which welding metal may be dropped to make a filled seam weld. This makes a stronger weld and a stronger drag link.

The inner wall of the end of the cylinder portion is screw-threaded at *k* to take the threads of the stamped plug *h* so that this may be screwed in to bear against the abutment *d*. The top of the cylindrical portion of the drag link is slotted as at *l* to permit the ball *b* and the stem of the arm *a* to be fitted in the end of the drag link. Ordinarily some kind of leather or similar cover is provided for this slot so as to cover the major portion of it. As will presently appear, I accomplish this by the use of a special form of key as a lock nut to hold the stamped plug *h* in place. After the plug has been screwed in place, the key *m* is slipped into the slot *l* at the rear of the arm *a* and the tip *n* of the key can protrude through one of the slots *o* in the flange of the plug. This flange *g* of the plug fits over the end of the cylindrical portion of the drag link and also fits over the key *n* and holds the same in place, to-wit, in the slot *l*. Consequently this key serves as a lock nut and at the same time serves to cover the major portion of the slot that would otherwise be left without cover.

The inside of this plug is also screw-threaded to take the stamped grease cup *p*. This grease cup is provided with an outwardly projecting wing *r* by which the same may be turned, and obviously by turning this grease cup down upon the grease the same is projected into the interior of the end of the drag link on the surface of the abutments and ball, which rub, and forms a very suitable form of lubricating the link. With the grease cup placed at the end of the link, it is handy to reach and at the same time it is out of the way so that it will not be projecting at a point where it is liable to receive a blow or be knocked off.

What I claim is:

1. In a drag link, the combination of a member provided at its end with an enlarged hollow portion internally threaded and slotted at the top to receive a ball and arm, and a stamped plug provided with turned-over edges and having one or more slots and a key fitted into the rear portion of the slot of the enlarged portion and engaging through one of the slots in the stamped plug to lock the same in place and serve to cover a portion of the slot.

2. In a drag link, the combination of a member provided with a hollow end portion internally screw-threaded, and a plug in the form of an inverted cup externally screw-threaded to engage in the end of the hollow member and provided with turned-over edges and having a plurality of slots, the said hollow member provided with a slot in its top to receive the arm and ball, and a key fitting into the said slot and provided with a reduced tip adapted to engage in one of the slots of the turned-over edges of the plug to lock the plug in place and serving to cover a portion of the slot in the top of the hollow member.

3. In a drag link, the combination of a member having at one end a hollow portion provided with internal screw-threads and having a slot to receive the arm and ball, and a stamped plug in the form of an inverted cup provided with external screw-threads and having a turned-over annular flange which turns back to engage over the end of the hollow member, and a key adapted to fit into the rear end of the slot in the top of the hollow member and adapted to engage the turned-over flange and the plug to lock the same in place.

4. In a drag link, the combination of a link member provided with a hollow end portion, a plug fitting inside the end of the hollow end portion and formed as an inverted cup, and a grease cup screwing inside of the cup portion of the plug.

5. In a drag link, the combination of a member provided with a hollow end portion internally screw-threaded, a plug in the form of a stamping externally screw-threaded and internally screw-threaded and screwing into the threads of the hollow end portion, and a grease cup screwing into the threads in the inside of the plug.

6. In a drag link, the combination of a member provided with a hollow end portion having a slot in one side to receive the arm and ball and provided with internal screw-threads in the end of the hollow end portion and a stamped metal plug in the form of an inverted cup having external threads adapted to screw into the threads of the hollow end portion, a key for fitting into the rear end of the slot in the hollow end portion and engaging with the stamped metal cup to lock the same in place, and a grease cup fitting into the hollow portion of the plug.

7. A drag link formed of a shell having a cylindrical hollow end portion and a main rod portion of square cross section.

8. A drag link having a shell formed of a stamping formed up into a cylindrical end portion, and a main rod portion of square cross section merging into the cylindrical portion.

9. A drag link having a shell formed of a stamping comprising an enlarged hollow end portion and a smaller rod portion of rectangular cross section with the edges abutting corner to corner and united by a filled weld seam.

In testimony wherof I affix my signature.

FRANK P. WILLIAMS.